Sept. 24, 1940.   J. M. WALTER   2,215,627
MACHINE TOOL DRIVE
Filed Feb. 1, 1939    6 Sheets-Sheet 4

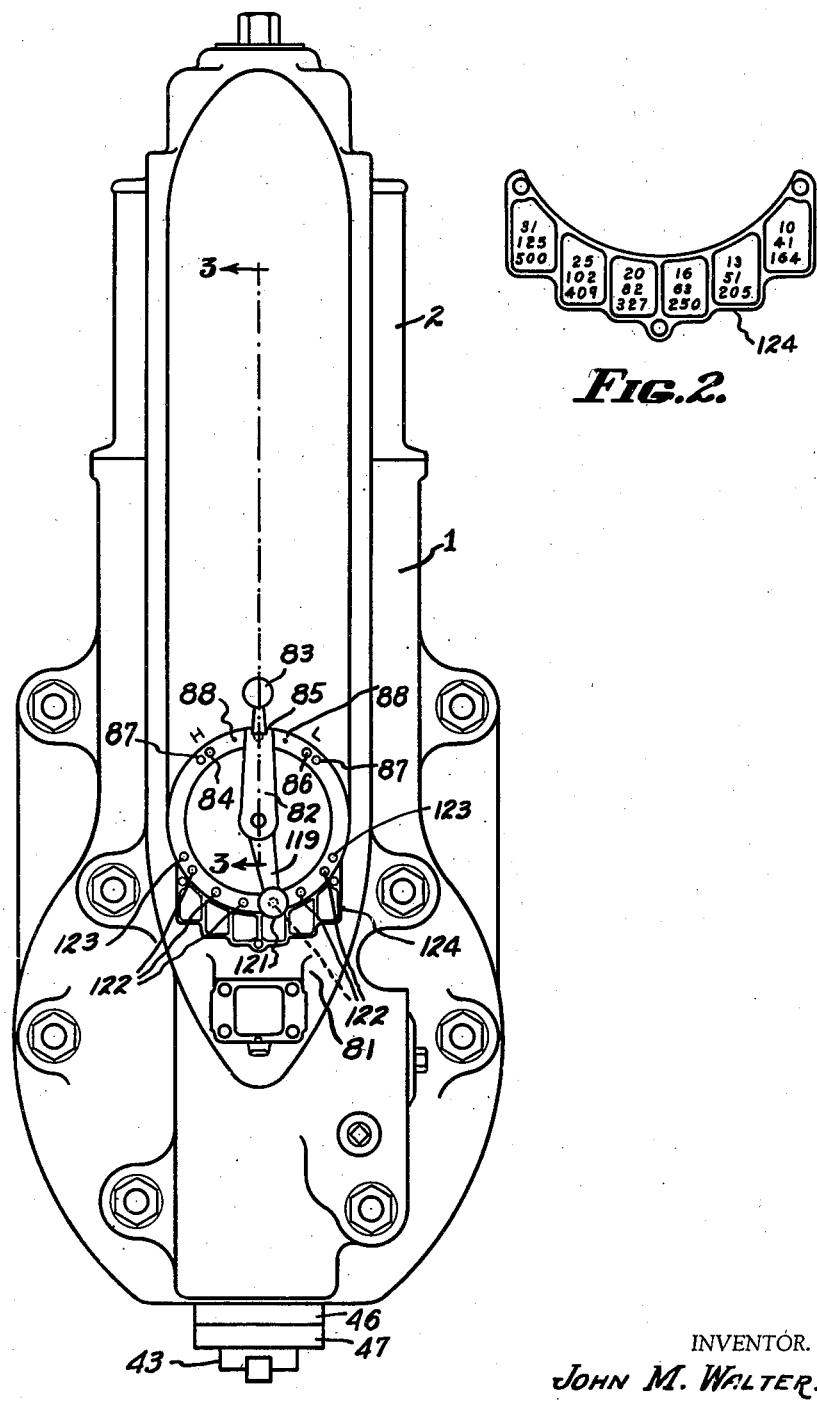

INVENTOR.
JOHN M. WALTER.
BY Allen & Allen
ATTORNEYS.

Sept. 24, 1940.   J. M. WALTER   2,215,627
MACHINE TOOL DRIVE
Filed Feb. 1, 1939   6 Sheets-Sheet 5
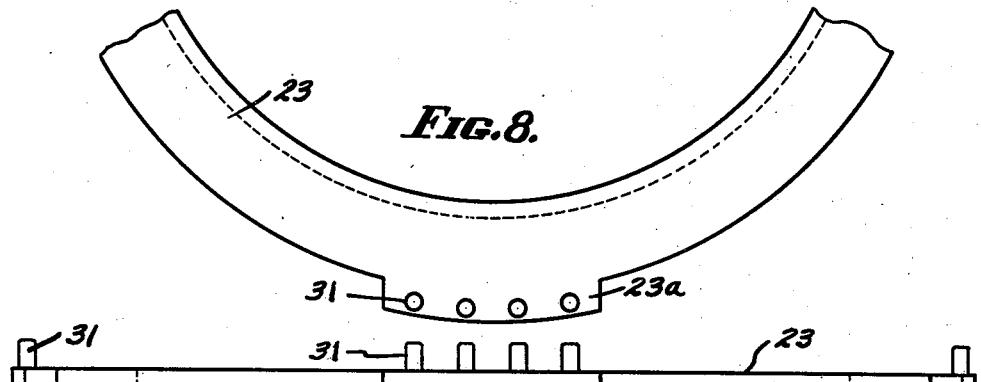
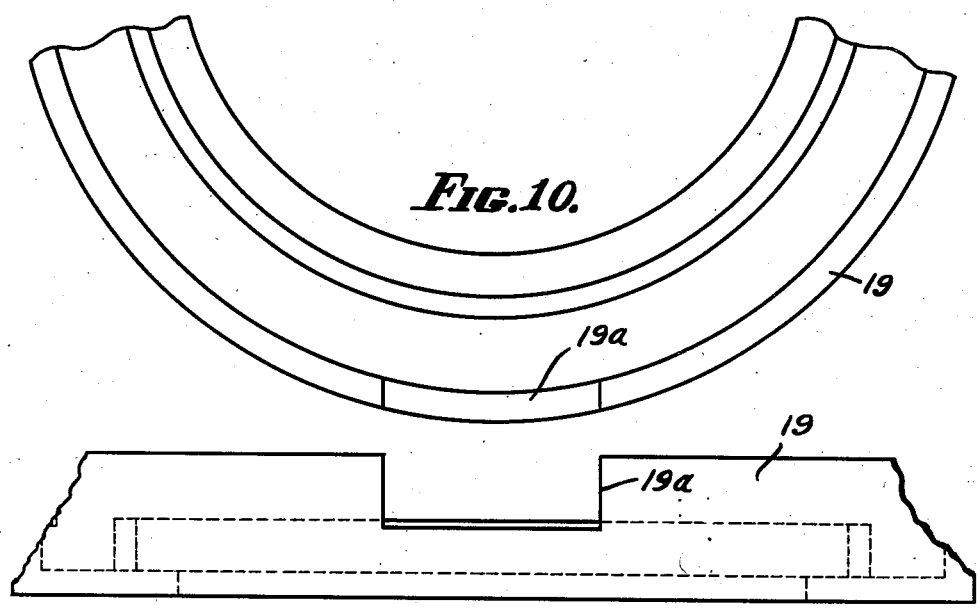
INVENTOR.
JOHN M. WALTER.
BY Allen & Allen
ATTORNEYS.

Sept. 24, 1940.   J. M. WALTER   2,215,627
MACHINE TOOL DRIVE
Filed Feb. 1, 1939   6 Sheets-Sheet 6

INVENTOR.
JOHN M. WALTER.
BY Allen & Allen
ATTORNEYS.

Patented Sept. 24, 1940

2,215,627

UNITED STATES PATENT OFFICE 2,215,627

MACHINE TOOL DRIVE

John M. Walter, Cincinnati, Ohio, assignor to The G. A. Gray Company, Cincinnati, Ohio, a corporation of Ohio Application February 1, 1939, Serial No. 255,671

12 Claims. (Cl. 74—277)

This invention relates to speed changing mechanisms and more particularly those of the planetary gear type.

One of the objects of the present invention is the provision of fluid pressure operated speed changing clutches of an improved and novel form which require no adjustment throughout their life.

Another important object of the present invention is the provision of fluid pressure operated speed changing clutches which function in such a manner so as to distribute the transmitted load equally among the several gears comprising a planetary gear train.

Another object of the present invention is the provision of a speed changing mechanism wherein the speed of the output shaft may be changed rapidly and without shock and with minimum manual effort.

A further object of the present invention is the provision of a speed changing mechanism of the planetary gear type wherein the speed of the output shaft may be changed without stopping or interrupting the speed of the input shaft.

Other objects of the present invention should be apparent by reference to the following specification and the accompanying drawings and as set forth in the appended claims.

In the drawings:

Figure 1 is a front elevation of a machine tool head, more specifically, a self-contained unit milling head as used on planer type milling machines, having my improved speed changing mechanism embodied therein;

Fig. 2 is an enlarged detached front elevation of the speed indicating dial;

Fig. 8 is a fragment of a plan view of one of the pressure plates;

Fig. 9 is a detail side elevation of same;

Fig. 10 is a fragment of a plan elevation of one of the annular cylinders;

Fig. 11 is a detail side elevation of same;

Similar reference characters indicate corresponding parts throughout the several figures of the drawings.

The drive mechanism

Figure 3:
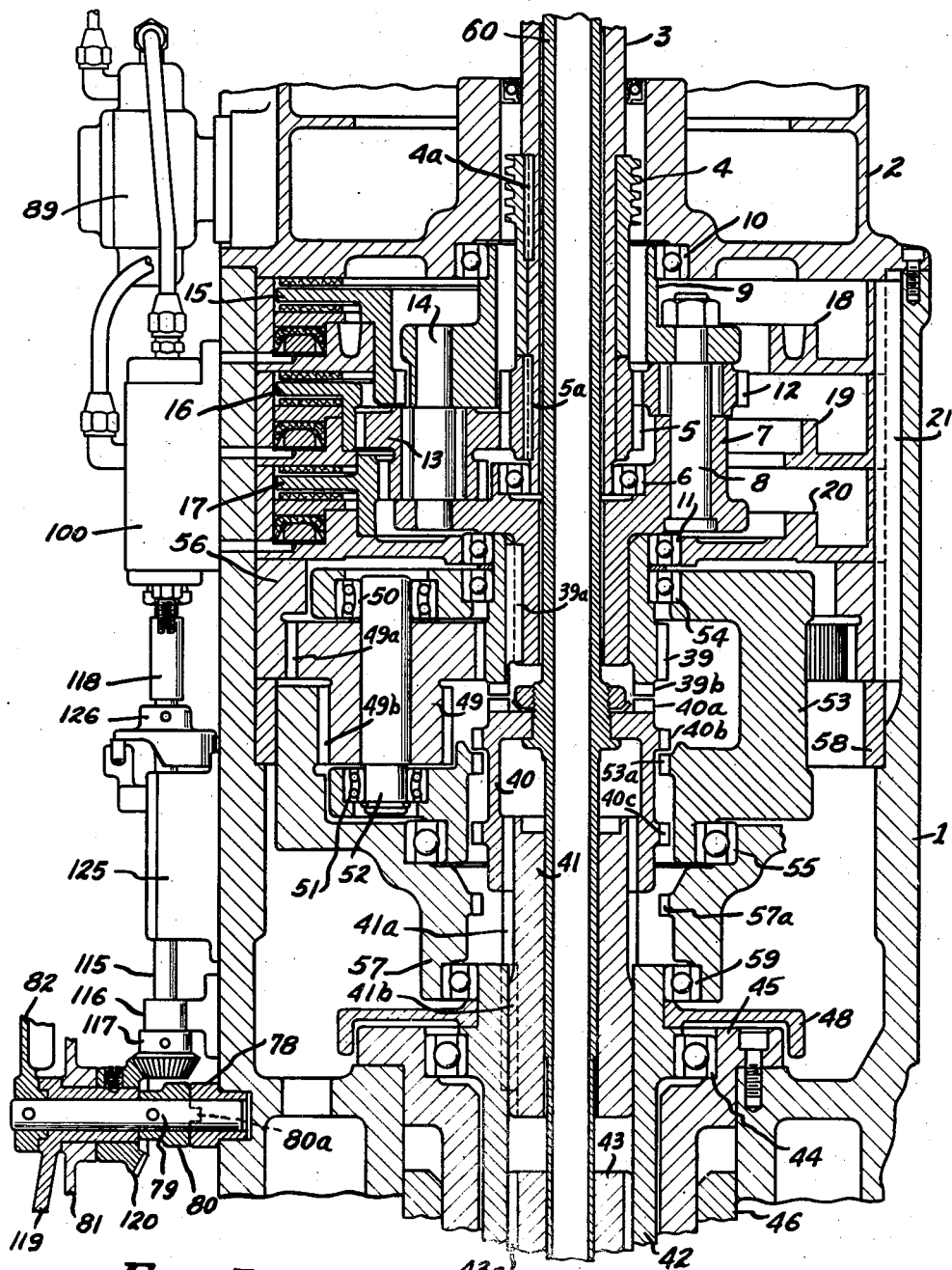
Fig. 3 is an enlarged vertical sectional view taken along line 3—3 of Figure 1, said section being taken on two planes at right angles to each other, meeting at the center axis of the device illustrated.
Figure 4:
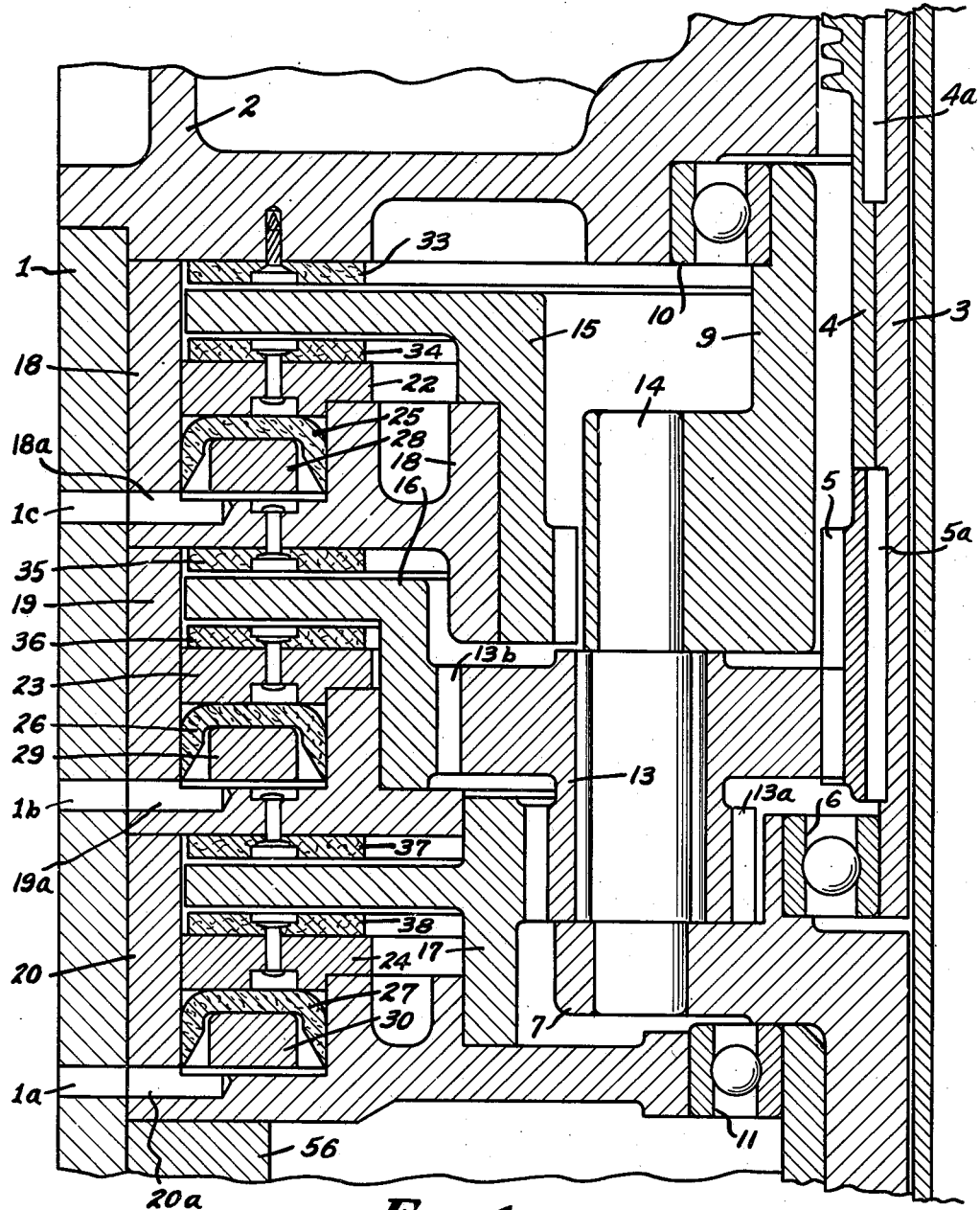
Fig. 4 is an enlarged vertical sectional view showing the fluid pressure cylinders and pistons.

Referring to the drawings, and more particularly to Figs. 3 and 4 thereof, 1 is a case to which is attached a motor frame 2. To the hollow motor shaft 3 are keyed worm 4 and sun pinion 5 by keys 4a and 5a respectively. The lower end of the motor shaft 3 is mounted in ball bearing 6 which in turn is supported in planet carrier 7. Three studs 8 are pressed into planet carrier 7. These serve to hold planet carrier 7 and flange 9 together as one structure. Ball bearing 10 supports the upper end of flange 9, while ball bearing 11 supports the lower end of planet carrier 7. Journaled on studs 8 are three planet pinions 12, and three compound planet gears 13 are journaled on studs 14. The three planet pinions 12 alternate with the three compound planet gears 13 to avoid interference. Thus there are three simple planet pinions 12 and three compound planet gears 13, the latter being composed of a small gear 13a and a larger gear 13b.

Internal gear 15 engages the three planet pinions 12, while internal gear 16 engages the three compound planet gears 13b, and internal gear 17 engages the three compound planet gears 13a. Planet pinions 12 and planet compound gears 13b also engage the sun pinion 5. Internal gear 15 is loosely journaled in annular cylinder 18, while internal gears 16 and 17 are loosely journaled in annular cylinders 19 and 20 respectively. While members 18, 19 and 20 are cylindrically flanged flat rings, the annular grooves therein which are rectangular in cross section, form hydraulic cylinders, and these members will hereafter be termed annular cylinders. Key 21 prevents annular cylinders 18, 19 and 20 from rotating in case 1. Annular cylinders 18, 19 and 20 are constrained against axial movement by internal gear 56, on the lower side and by motor frame 2 on the upper side.

Figure 5:
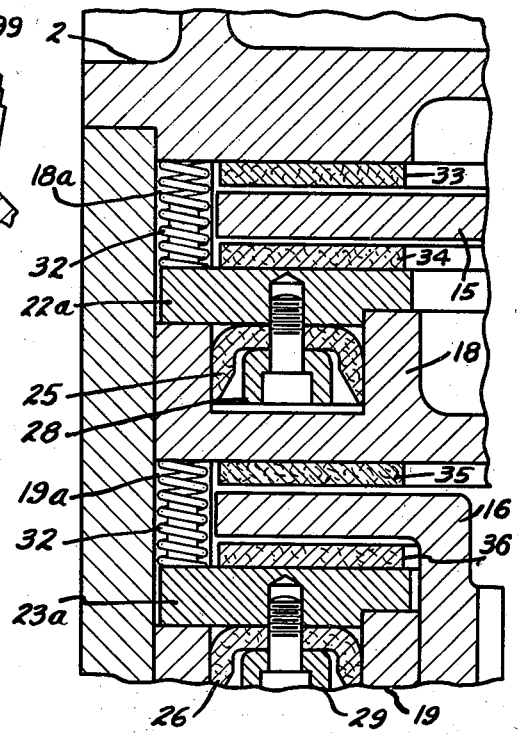
Fig. 5 is an enlarged vertical sectional view showing the friction discs and release springs.

Pressure plate 22, cup 25 and ring 28 bolted together comprise an annular piston which fits into the annular cylinder 18. Pressure plate 22 is constrained from rotating in annular cylinder 18 by four splines 22a which fit into slots 18a in the annular cylinder 18, see Figures 8, 9, 10 and 11. Projecting from the splines 22a are pins 31 which serve to retain springs 32, Figure 5, in place. Annular cylinder 19 contains a piston assembly composed of pressure plate 23, cup 26 and ring 29 bolted together, and annular cylinder 20 contains a piston assembly composed of pressure plate 24, cup 27 and ring 30 bolted together. Pressure plates 23 and 24 also have splines 23a and 24a, identical to 22a on pressure plate 22, which engage slots 19a and 20a in annular cylinders 19 and 20 respectively. (Parts 24a and 20a are not shown.) These splines prevent the rotation of pressure plates 23 and 24 in their respective annular cylinders. Splines 23a and 24a also have projecting pins 31 for retaining springs 32. Said springs 32 serve to hold the piston assemblies in their normal or released position. Friction disc 33 is riveted to motor frame 2 while friction disc 34 is riveted to pressure plate 22. Also friction disc 35 is riveted to annular cylinder 18, while friction disc 36 is riveted to pressure plate 23. Also friction disc 37 is riveted to annular cylinder 19 while friction disc 38 is riveted to pressure plate 24.

Assuming now that sun pinion 5 is caused to rotate by motor shaft 3, and that internal gear 15 is constrained against rotation by admitting fluid pressure into cylinder 18, and that internal gears 16 and 17 are free to rotate, it will be apparent it is believed, that planet carrier 7 will be caused to rotate at a speed which will be slower than that of the sun pinion 5. Likewise, if internal gear 16 is constrained against rotation and internal gears 15 and 17 are free to rotate, planet carrier 7 will be caused to rotate at a speed somewhat slower than it rotates when internal gear 15 is constrained from rotating. Also if internal gear 17 is constrained against rotation and internal gears 15 and 16 are free to rotate, planet carrier 7 will be caused to rotate at a speed somewhat slower than it rotates when internal gear 16 is constrained from rotating. Thus for a given speed of sun pinion 5, planet carrier 7 may be caused to rotate at three different speeds by constraining one or another of the internal gears 15, 16 or 17, and allowing the unconstrained internal gears to rotate freely.

In the present embodiment I prefer to use a motor capable of running at two different speeds, the lower speed being one-half that of the higher speed.

Assume now that sun pinion 5 is rotating at the higher motor speed. If internal gear 15 is then constrained against rotation, planet carrier 7 will be caused to rotate at its highest speed, while if internal gear 16 is constrained against rotation, planet carrier 7 will be caused to rotate at a speed second from its highest speed, and if internal gear 17 is constrained against rotation, planet carrier 7 will be caused to rotate at a speed third from its highest speed.

Assume now that sun pinion 5 is rotating at the lower motor speed. If internal gear 15 is then constrained against rotation, planet carrier 7 is caused to rotate at a speed fourth from its highest speed, while if internal gear 16 is constrained against rotation, planet carrier 7 is caused to rotate at a speed fifth from its highest speed, and if internal gear 17 is constrained against rotation, planet carrier 7 is caused to rotate at a speed sixth from its highest speed. Thus planet carrier 7 can be caused to rotate at six different speeds.

Sun gear 39, see Figure 3, is keyed to planet carrier 7 by key 39a. Clutch teeth 39b extend from the lower end of said sun gear. Sliding clutch 40 has clutch teeth 40a extending from its upper end, while clutch teeth 40b and 40c extend radially from the outside diameter thereof. Clutch 40 is slidably splined to shaft 41 having splines 41a. Shaft 41 is pressed into spindle sleeve 42 and is keyed therein by key 41b. Spindle 43 is slidably splined in the spindle sleeve 42 by splines 43a. Thus sliding clutch 40, shaft 41, spindle sleeve 42, and spindle 43 are caused to rotate together. However, clutch 40 and spindle 43 may be moved axially and retain their driving connection through the splines. The spindle sleeve 42 is supported at its upper end by ball bearing 44 and by another ball bearing, not shown on the drawings because the view is broken off, at its lower end. These ball bearings are in turn supported in the bearing sleeve 45 which is bolted to the case 1. The lower end of spindle 43 is supported in roller bearings, which also are not shown on the drawings because the view is broken off. The roller bearings are in turn supported in the quill 46, being retained therein by flange 47, Figure 1, which is bolted to the lower end of the quill. The spindle 43 and the quill 46 may be moved axially in unison. An oil thrower 48 is pressed on the spindle sleeve 42, thereby being caused to rotate with the sleeve and causing the oil to be thrown off to return to the oil reservoir. Three compound planet gears 49 are spaced 120 degrees apart around the sun gear 39 and consist of a larger gear 49a and a smaller gear 49b. Said compound planet gears are journaled in ball bearings 50 and 51 through the intermediary studs 52. The planet carrier 53 supports the ball bearings 50 and 51 and is journaled by ball bearing 54 at its upper end and by ball bearing 55 at its lower end. Extending radially and inwardly from the bore of planet carrier 53 are clutch teeth 53a which are formed to mesh with clutch teeth 40b on the sliding clutch 40. The larger gears 49a of the planet compound gears 49 engage the sun gear 39 and also the fixed internal gear 56. Said internal gear is constrained from rotating by the key 21. The small gears 49b of the planet compound gears 49 engage the internal gear 57 which is journaled at its upper end in the liner 58 and by ball bearing 59 at the lower end. Said ball bearing 59 is in turn supported on the spindle sleeve 42. Extending radially and inwardly from the bore of internal gear 57 are clutch teeth 57a which are formed to mesh with clutch teeth 40c on the sliding clutch 40.

If the sun gear 39 is rotated, it is believed that it will be apparent, by reason of the proportions and the arrangement of the gears as shown on the drawings, that the planet carrier 53 will rotate at a slower speed than that of the sun gear. If the gears are proportioned as shown on the drawings the ratio of the revolutions of the sun gear 39 to the revolutions of the planet carrier 53 will be approximately 4 to 1. It is also believed that it will be apparent, by reason of the proportions and the arrangement of the gears as shown on the drawings, that the internal gear 57 will be caused to rotate at a speed considerably slower than that of the sun gear 39, when the latter is rotated. If the gears are proportioned as shown on the drawings, the ratio of the revolutions of the sun gear 39 to the revolutions of the internal gear 57 will be approximately 16 to 1.

When the sliding clutch 40 is shifted to its uppermost position, so as to engage clutch teeth 40a with clutch teeth 39b, the spindle 43 is caused to rotate at the same speeds at which the sun gear 39 rotates. As has been described, the sun gear 39 which is fast on planet carrier 7 may be caused to rotate at six different speeds. Thus the spindle 43 may be caused to rotate at the six highest speeds. By shifting the sliding clutch 40 downward to engage clutch teeth 40b with the clutch teeth 53a formed on planet carrier 53, the spindle may be caused to rotate at the same speed at which the planet carrier 53 rotates. Thus the spindle may be caused to rotate at six intermediate speeds. By shifting the sliding clutch 40 to its lowest position, clutch teeth 40c will engage clutch teeth 57a formed on internal gear 57, and the spindle may be caused to rotate at the same speed at which the internal gear 57 rotates. Thus the spindle may be caused to rotate at the six lowest speeds.

It will now be apparent that by preventing the rotation of one or another of the internal gears 15, 16 or 17, and by causing the motor to run at its high or low speed, and by shifting the sliding clutch 40 to one of its three driving positions, any one of eighteen different spindle speeds may be obtained.

In the drawings the sliding clutch 40 is shown in a neutral position. The clutch may be retained, by means which will appear later, in any one of five positions, three of which provide a driving connection and two of which provide neutral positions.

The clutch shifting mechanism

Figure 13:
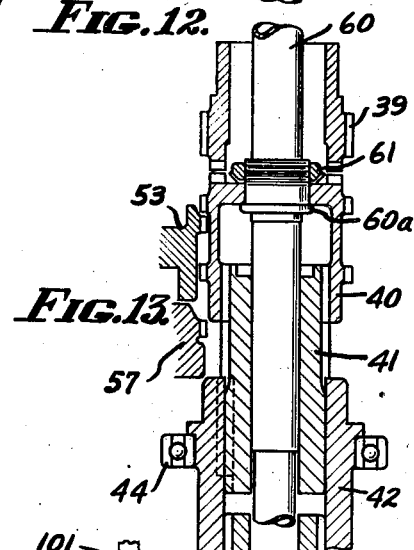
Fig. 13 is a vertical sectional view showing the sliding clutch.

The sliding clutch 40 is secured on the tube 60, see Figure 13, by means of nut 61 which clamps the clutch against the shoulder 60a formed on the tube. Said tube extends upward through the hollow motor shaft 3. A ball bearing 62, Figure 13, is secured to the upper end of the tube, the inner race of the ball bearing being clamped between the two nuts 63 which are threaded on the tube.

The outer race of the ball bearing is a sliding fit in the bore 64a of the motor cap 64. Two slots are cut in the motor cap 64 at diametrically opposite sides through which trunnion blocks 65 pass. These trunnion blocks are formed with a slot on their inner ends which fit loosely over the sides of the outer race of the ball bearing 62 and with a cylindrical portion on their outer ends which are rotatably fitted in bored holes in the forked end of lever 66. Lever 66 is pivoted on pin 67 in the bracket 68 which is secured to the motor cap 64. A torsion spring 69 is mounted on the hub of the lever 66. One end of the torsion spring engages the lever 66, while one end rests on the motor cap 64. The purpose of the spring is to counterbalance the weight of the clutch 40 and the tube 60. The arm 66a is formed integral with the forked lever 66 and carries a stud 70 at its forward end. A second lever 71 is pivoted on stud 72 which is fast in the motor frame 2. A rod 73 having knuckle joints 74 at each end forms the connection between the stud 70 in the arm 66a and stud 75 which is fast in the lever 71. A tube 76 having forked ends 76a with pins 77 forms the connection between the lever 71 and arm 78. The hub of the arm 78 fits into a bored hole in the case 1, see Figure 3, and is bored to receive the shifter shaft 79 to which is pinned a collar 80. Said collar has two projecting tongues 80a which fit into the slots 78a in the arm 78, thus forming the driving connection between the shaft and the arm. A driving connection of this type is desirable as it provides a simple connecting means when assembling the cover 81 on the case 1. A shifting lever 82 is pinned on the end of shifter shaft 79. The shifting handle 83, Figure 1, is pivotally mounted in the shifting lever 82, to act as a latch to retain the lever in position, the handle having a projecting pin which engages one or another of the holes 84, 85 or 86 in the cover 81. Studs 87 project from the cover and serve as stops to limit the movement of lever 82. Detents 88 serve to retain the lever in the neutral positions.

Thus it will be apparent that by placing the shifting handle 83 so as to engage one or another of the holes 84, 85 or 86, the clutch 40 will be shifted to its corresponding driving position.

The hydraulic system

Figure 6:
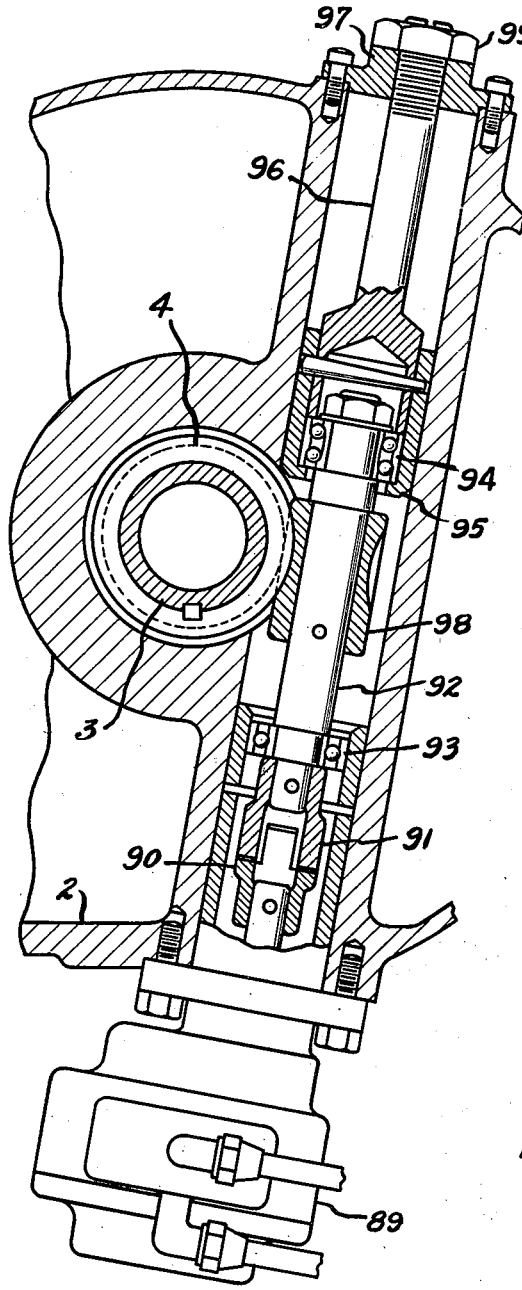
Fig. 6 is a sectional view of the pump drive.

The pump 89 is flange mounted on the motor frame 2 (see Figure 6), and provides pressure for the fluid, which in the present embodiment is lubricating oil which serves also to lubricate the mechanism. As the pump is of the gear type which can be purchased commercially and serves only to impose pressure on the oil, no description of this unit is deemed necessary. A jaw coupling 90 is pinned to the pump shaft and engages a similar jaw coupling 91 pinned to the worm gear shaft 92. Shaft 92 is journaled in ball bearings 93 and 94, the latter being mounted in sleeve 95. Extension 96 is pressed into and pinned to sleeve 95 and at its outer end is threaded into flange 97 which is bolted to the motor frame. By this means, the worm gear shaft assembly may be adjusted axially to secure the proper bearing contact between the worm 4 and the worm gear 98, which is also pinned to the shaft 92. Nut 99 serves as a lock nut.

In the present embodiment the pump is provided with built-in ball check valves which function automatically to maintain oil delivery irrespective as to whether the pump is driven in a clockwise or an anti-clockwise direction. This type of pump is well known in the art. Thus a switch may be provided for reversing the direction of rotation of the motor, and consequently the entire drive, including the spindle without effecting the delivery of the pump.

Figure 15:
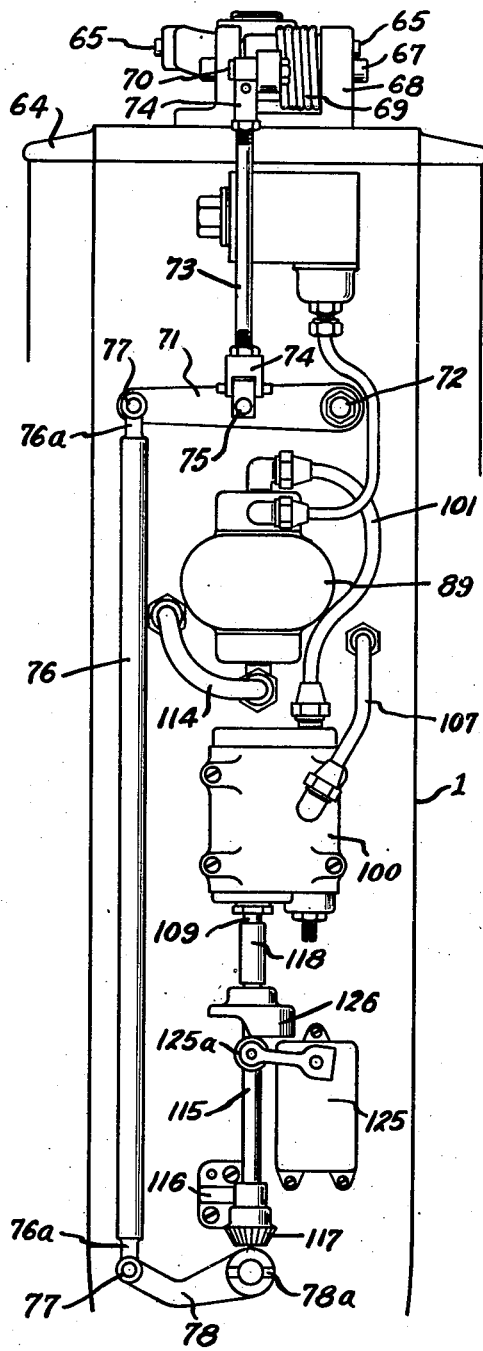
Fig. 15 is a front elevation of the upper part of the milling head with the covers removed.
Figure 14:
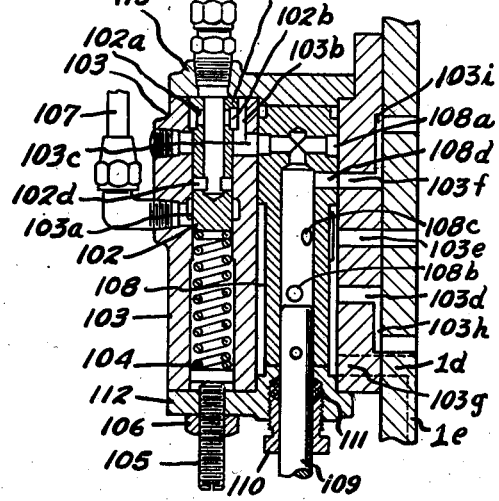
Fig. 14 is a vertical sectional view of the valve.

A combination selector and by-pass valve 100 is bolted to case 1 (see Figures 14 and 15). The purpose of this valve is to direct pressure oil to one or another of the annular cylinders 18, 19 and 20 and to by-pass the surplus oil. Pressure oil from the pump enters the valve through pipe 101 and passes into the hollow piston 102 and through drilled holes 102a, into annular groove 102b formed on the outside of the piston. At the upper end of head 102c is formed on the piston to limit its downward travel in the event of spring breakage or when unduly high pressure is developed from any cause whatsoever. Near the lower end of the piston slots 102d are cut through which the oil is by-passed into the annular groove 103a, formed in the valve body 103, when the pressure on the piston is sufficient to overcome the pressure exerted by the spring 104. The pressure exerted by spring 104 may be adjusted by the screw 105 which is locked by nut 106. Annular groove 103a connects with pipe 107 through which the oil passes when leaving the valve.

The annular groove 102b connects with the slot 103b, which in turn connects with the drilled hole 103c in the valve body 103. Sleeve 108 is closely fitted to be rotatable in the bore of valve body 103, and has an annular groove 108a at its upper end. This annular groove connects by drilled holes with the bore of the sleeve. An extension shaft 109 is pressed into and pinned in the lower end of the sleeve. A packing nut 110 and packing 111 in cap 112, which is bolted to the valve body, serve to prevent leakage at the lower end of the valve, while cap 113 is bolted to the valve body to close the upper end. Drilled radially in sleeve 108 are six ports, 108b, 108c, 108d, 108e, 108f and 108g, one or another of which can be made to register with one or another of ports 103d, 103e and 103f, in the valve body 103, by rotative movement of the sleeve.

Figure 7:
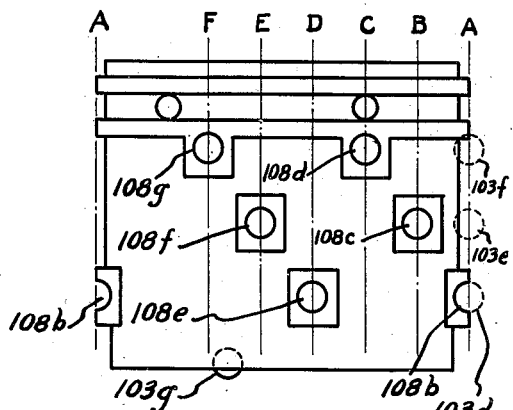
Fig. 7 is a developed plan view of the outer cylindrical surfaces of the valve sleeve.
Figure 12:
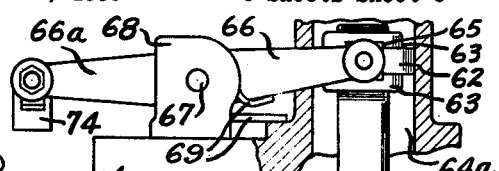
Fig. 12 is a side elevation of part of the clutch shifting mechanism.

A cam which controls the two speed motor in the present embodiment, as previously referred to and as will appear presently, is rotated by the same shaft which rotates the valve sleeve 108. Thus the valve sleeve 108 has two ports for each port in the valve body 103, one port in the valve sleeve registering with the port in the valve body for the low motor speed, and the other port in the valve sleeve registering with the same port in the valve body for the high motor speed. The arrangement of the ports in the valve sleeve 108 is shown in Figure 7, which is a developed view of the cylindrical surfaces of the valve sleeve. When the valve sleeve is in position A, ports 108b and 103d register, in position B ports 108c and 103e register, in position C, ports 108d and 103f register, in position D, ports 108e and 103d register, in position E, ports 108f and 103e register, and in position F, ports 108g and 103f register. When the valve sleeve is in position A, the lowest of the six speeds is obtained, while the highest is obtained when the valve sleeve is in position F. The speed of the two speed motor is changed, as will appear presently, from the lower to the higher speed when the valve sleeve is rotated from position C to position D.

Port 103g in the valve body 103 registers with port 1d in the case 1, said port connecting with groove 1e (Figure 14) which leads to the oil reservoir in the lower end of case 1. Thus it will be apparent that two of the three ports 103d, 103e and 103f are open to port 103g, which is open to drain, in all six positions of the valve. Port 103d connects with groove 103h which in turn connects with port 1a which registers with port 20a in the annular cylinder 20 (see Figures 4 and 14). Port 103e registers with port 1b which registers with port 19a. Port 103f connects with groove 103i which in turn connects with port 1c which registers with port 18a.

The oil circuit is as follows: Oil is drawn from the reservoir in the lower end of case 1, through pipe 114 by the pump, which delivers pressure oil through pipe 101 to the valve 100. Here it is selectively directed to one or another of the annular cylinders 18, 19 or 20, and the surplus oil is by-passed into pipe 107. This pipe returns the oil into case 1 at a level above the driving mechanism where it cascades downward over the several parts and returns to the oil reservoir.

As previously stated, the internal gears 15, 16 and 17 are loosely journaled in their respective annular cylinders. The purpose of this is to permit the gear being constrained to automatically center itself, so the pitch circle of the internal gear teeth will be concentric with the center around which the centers of the planet pinions are rotating. This self-centering occurs when the internal gear is constrained against rotation, as it will be apparent that the internal gear will then center itself so as to distribute the load, imposed by reason of the constraining action, equally among the three planet pinions. This constraining means overcomes the objectional construction in planetary gear trains where the constraining means tends to displace the gear center, causing unequal distribution of the gear loads and resulting in noisy operation and rapid wear of the parts.

The valve actuating mechanism

The vertical shaft 115 is journaled at its lower end in bracket 116 bolted to case 1, see Figures 3 and 15. A bevel pinion 117 is pinned to the lower end of the shaft, while the upper end is secured to the shaft 109 by the coupling 118. A shifting lever 119 is journaled in the cover 81 and has a bevel gear 120 fixed on its hub and spaced in driving relation to bevel pinion 117. A knob 121, Figure 1, is fast on a plunger slidably mounted in the shifting lever 119. The plunger is yieldably retained in its inward position by a spring and can be placed in any one of the six holes 122. Thus by placing the shifting handle 119 in any one of the six positions afforded by the holes 122, the ports in the valve sleeve 108 will be caused to register selectively with the ports in the valve body 103. Stop studs 123 limit the travel of the shifting handle. A stationary dial 124, Figures 1 and 2, is secured to cover 81, the indications upon the dial showing the speed of the spindle. These indications may be chosen to show the peripheral speeds at given diameters or to show the linear speed of objects propelled by the output shaft. The indications on the shorter radius apply when the shifter lever 82 is in the low gear position, while those on the mean radius apply when lever 82 is in the intermediate position, and those on the larger radius apply when lever 82 is in the high gear position. It is obvious, of course, that the present showing of six step changes and three back gear changes is an arbitrary one and that any desirable speed change capacity may be provided. It is also obvious that two or more planetary gear sets, each having one or more speed changes, selectively obtained by constraining one of the members of the planetary trains by fluid pressure means, may be arranged in series so that the output shaft of one set drives the input shaft of another set. In such an arrangement, all speed changes could be obtained by fluid pressure constraining means controlled by one valve and one selector lever.

I have not included a separate view of this modification but it will be evident that a unit such as shown in the upper portion of Fig. 3 would be substituted for the gear and clutch arrangement now at the lower portion of this figure. Then there would be either two control valves such as have been shown or some other desirable arrangement.

The motor speed control

In the present embodiment a two speed motor is used which may be a polyphase induction motor so wound as to run at two speeds such as 900 R. P. M. or 1800 R. P. M. A two-position switch 125 is provided for changing the speed of the motor. The switch is operated manually by the cam 126 which is pinned to the shaft 115. When the switch is in the position shown in Figure 15, contacts in the switch are closed which energize contactors, by means usual to the art, connected with the low speed windings of the motor stator and cause the motor to run at its lower speed. When the shaft 115 is rotated to the right in Figure 15, the switch roller 125a is forced against the thin part of the cam 126 by a spring inside the switch, causing the first set of contacts in the switch to be opened and a second set to be closed. This energizes a second set of contactors connected with the high speed windings of the stator and causes the motor to run at its high speed.

It will be apparent that the motor may be one having more than two speeds, and that the cylindrical valve arrangement could be provided with additional series of parts, with suitable modification in the cam structure to change the motor speed intermediate each of the series.

These electrical devices and connections are well known in the art and form no part of this invention except as they are necessary as a means to obtain two motor speeds.

While the invention has been illustrated and its salient features explained in connection with a milling machine spindle drive, it is, of course, to be understood that I do not necessarily confine myself to this particular adaptation of this invention since it has many possibilities in machines of other types where speed changes are required.

Having thus described and shown an embodiment of this invention, what I claim and desire to secure by Letters Patent of the United States is:

1. In combination a series of speed change devices arranged about a common axis of revolution with a tool retaining device, the speed of which is controlled thereby, a shaft driven by power, a series of planetary elements arranged concentrically on said axis, comprising a gear carrier, a series of planetary gears thereon, and a series of ring gears, means for retaining selectively the ring gear members thereof to effect speed changes of the gear carrier member serving said members, a change gear mechanism, a clutch connecting said carrier to a change gear mechanism, or to the tool retaining device, operating devices for the selective retaining means and the clutch, and control means for the said operating device projecting to a common control point whereby all speeds can be controlled from said point.

2. In combination a series of speed change devices arranged about a common axis of revolution with an output spindle, the speed of which is controlled thereby, a shaft driven by power, a series of planetary elements arranged concentrically on said axis comprising a gear carrier, a series of planetary gears thereon, and a series of ring gears, means for retaining selectively the ring gear members thereof to effect speed changes of the gear carrier member serving said members, a change gear mechanism, a clutch connecting said carrier to a change gear mechanism, or to the output spindle, operating devices for the selective retaining means and the clutch, and control means for the said operating device projecting to a common control point whereby all speeds can be controlled from a said point, a multi-speed motor for driving the first mentioned shaft, and means for shifting said motor from one speed to the other, said means being actuated by movement of one of the controls above mentioned.

3. In a planetary speed change mechanism, a plurality of planetary gear trains including sun gear, planetary gear carriers and ring gears, a plurality of movement restraining means for said trains and fluid pressure operated means for selectively operating said movement restraining means including a common valve, a multi-speed drive for said planetary mechanism, means for operating the speed changer of said drive, an operating device for said valve, and means on said operating device for actuating the operating means for changing drive speed, said valve comprising a common sleeve to which fluid pressure is supplied and ports arranged in said sleeve to communicate with the several movement restraining means.

4. In a planetary speed change mechanism, a plurality of planetary gear trains including sun gear, planetary gear carriers and ring gears, a plurality of movement restraining means for said trains and fluid pressure operated means for selectively operating said movement restraining means including a common valve, a multi-speed drive for said planetary mechanism, means for operating the speed changer of said drive, an operating device for said valve, and means on said operating device for actuating the operating means for changing drive speed, said valve comprising a common sleeve to which fluid pressure is supplied and ports arranged in said sleeve to communicate with the several movement restraining means, said valve having a plurality of sets of ports, and the means on the operating device being set to operate the speed shifting means intermediate the operating position of each of the sets of ports.

5. In a machine tool speed change device, a speed control device at a single location, a plural speed drive, two separate speed change devices, one driving into the other and each arranged to provide three different speeds, and each arranged axially of each other, said speed control device having means for operating the plural speed device selectively, and the elements of the two separate speed change devices selectively.

6. In a planetary gear change mechanism, a sun gear, a plurality of planetary gears arranged circumferentially thereof, a ring gear in engagement with the planetary gears, a support for the ring gear fixedly mounted against rotation and means in connection with said support comprising a ring shaped cylinder, a ring shaped piston element therein, said piston element having ring shaped means to contact the ring gear and restrain the movement of the ring gear, and fluid means for energizing the piston element, and a planetary gear carrier for said planetary gears.

7. In a planetary gear change mechanism, a sun gear, a series of planetary gears engaging the sun gear at one plane, another series of planetary gears engaging the sun gear at another plane, a series of fixed members having ring shaped cylinder portions, a series of rotatably supported ring gears one for each of the series of planetary gears, arranged in a co-axial series alternating with the fixed members, and ring shaped pistons in said cylindrical portions arranged to press against the faces of the ring gears thereby selectively constraining them, and a planetary gear carrier in which the several series of planetary gears are mounted.

8. In a planetary gear change mechanism, a sun gear, a planetary gear carrier, planetary gears arranged in a plurality of circumferential series in engagement with the sun gear, each at a different level, ring gears for each of the series of planetary carriers, fixed annular members arranged in a coaxial series with the ring gears, upon which the gears are supported, fluid pressure annular cylinder means on the fixed annular members, annular pistons therein, said pistons arranged to engage each the adjacent ring gear and frictionally retain it selectively.

9. In a planetary gear change mechanism, a sun gear, a series of planetary gears engaging the sun gear at one plane, another series of planetary gears engaging the sun gear at another plane, a series of fixed members having ring shaped cylinder portions, a series of rotatably supporting ring gears one for each of the series of planetary gears, arranged in a co-axial series alternating with the fixed members, and ring shaped pistons in said cylindrical portions arranged to press against the faces of the ring gears thereby selectively constraining them, and a planetary gear carrier in which the several series of planetary gears are mounted, said pistons having flat ring gear engaging members, located near the outer periphery of the ring gears.

10. In a planetary gear change speed mechanism means for mounting and retaining the ring gears selectively comprising a casing, a coaxial series of alternate ring gears and fixed annuli within the casing, the ring gears being rotatably supported between the annuli, annular cylinder means in the fixed annuli, and annular pistons therein arranged when operated each to engage the face of its adjacent ring gear, and means for selectively applying fluid pressure to said annular cylinder means.

11. In a planetary gear change speed mechanism means for mounting and retaining the ring gears selectively comprising a casing, a coaxial series of alternate ring gears and fixed annuli within the casing, the ring gears being rotatably supported between the annuli, annular cylinder means in the fixed annuli, and annular pistons therein arranged when operated each to engage the face of its adjacent ring gear, and means for selectively applying fluid pressure to said annular cylinder means, the location of the alternate series being such that application of its piston to any ring gear except the end gear of the series moves the piston-engaged gear into engagement also with the face of the adjacent fixed annulus.

12. In combination in a machine tool drive, a series of fluid operated planetary gear speed change elements, a drive for the same including a multiple speed motor, a valve control arranged at various positions to selectively operate the planetary gear speed change elements, including an operating lever for the same, means whereby said lever also controls the motor speed, said operating lever connections arranged so that when said lever moves about its fulcrum step by step, it traverses first the steps whereby the planetary gear speed changes are effected, then a step whereby a motor speed is shifted and the first planetary gear speed change is re-established followed by additional steps for repeating the planetary gear changes.

JOHN M. WALTER.